April 6, 1943. E. P. STAMM 2,316,111
METHOD OF CUTTING RECTANGULAR LUMBER
Filed Jan. 12, 1942 2 Sheets-Sheet 1
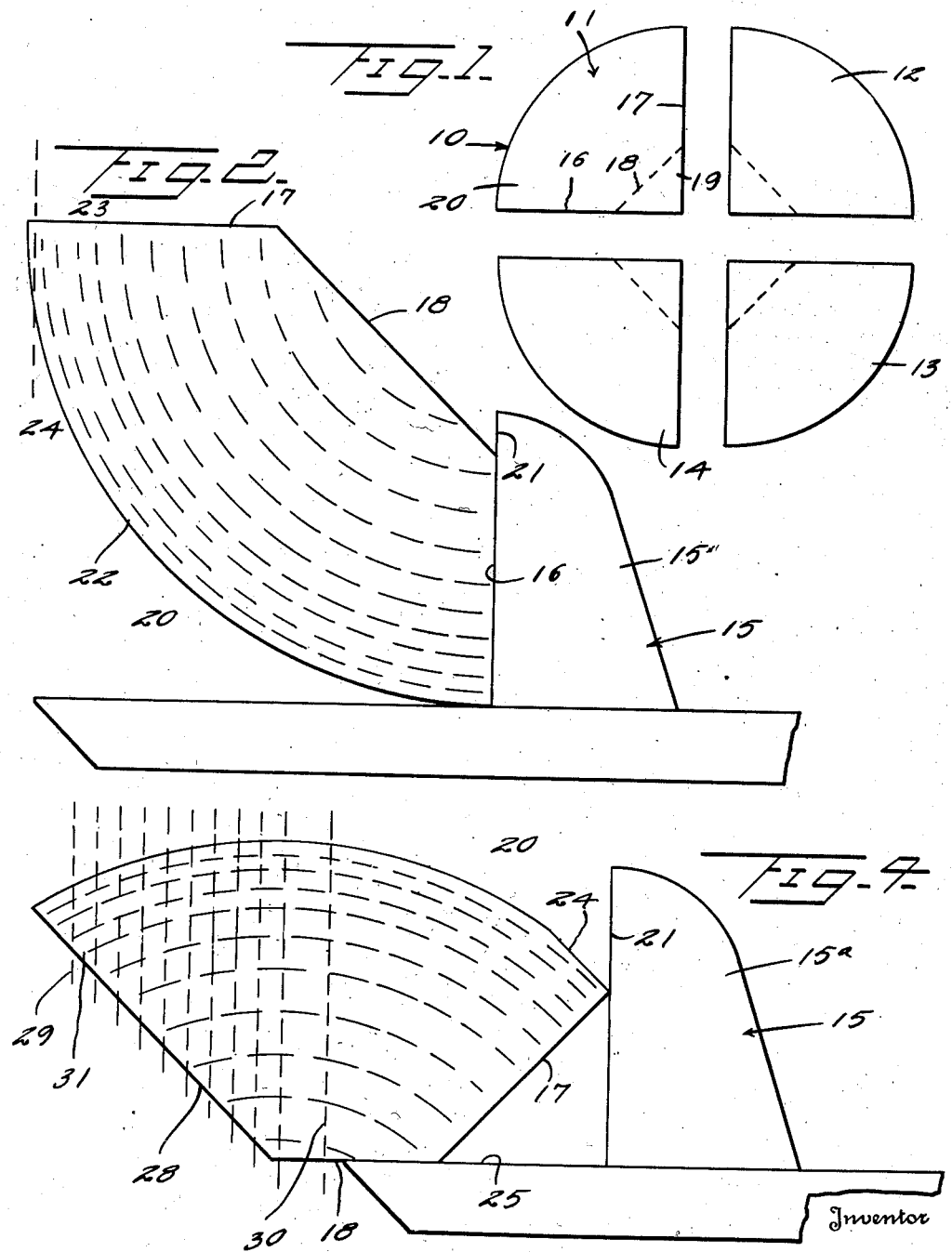

April 6, 1943. E. P. STAMM 2,316,111
METHOD OF CUTTING RECTANGULAR LUMBER
Filed Jan. 12, 1942 2 Sheets-Sheet 2
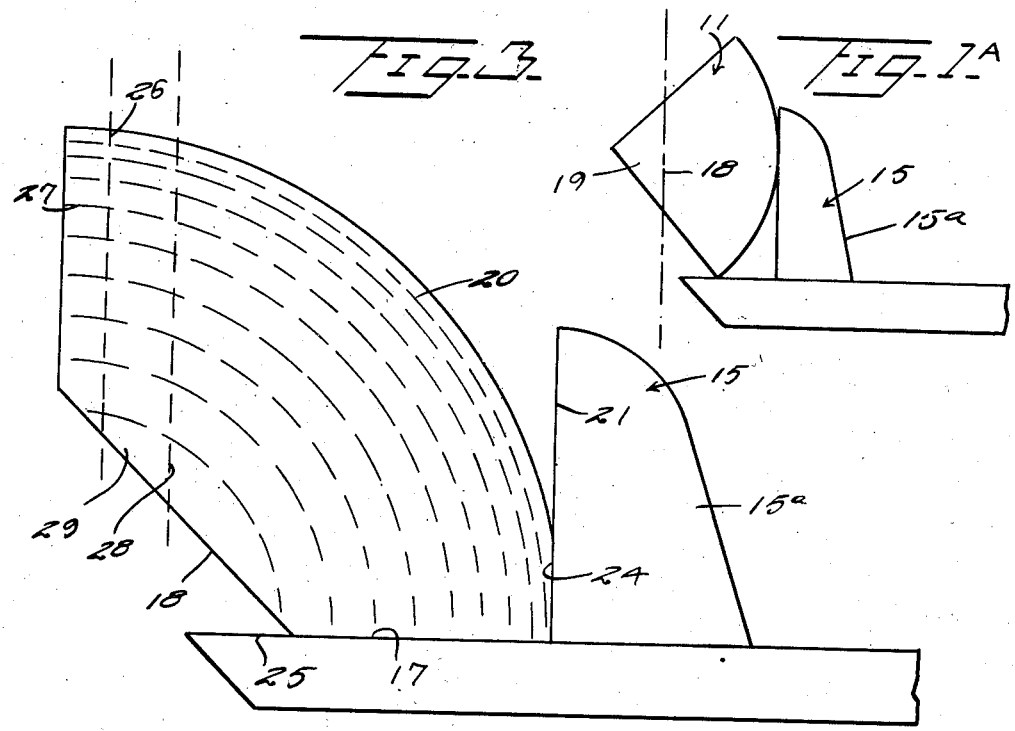
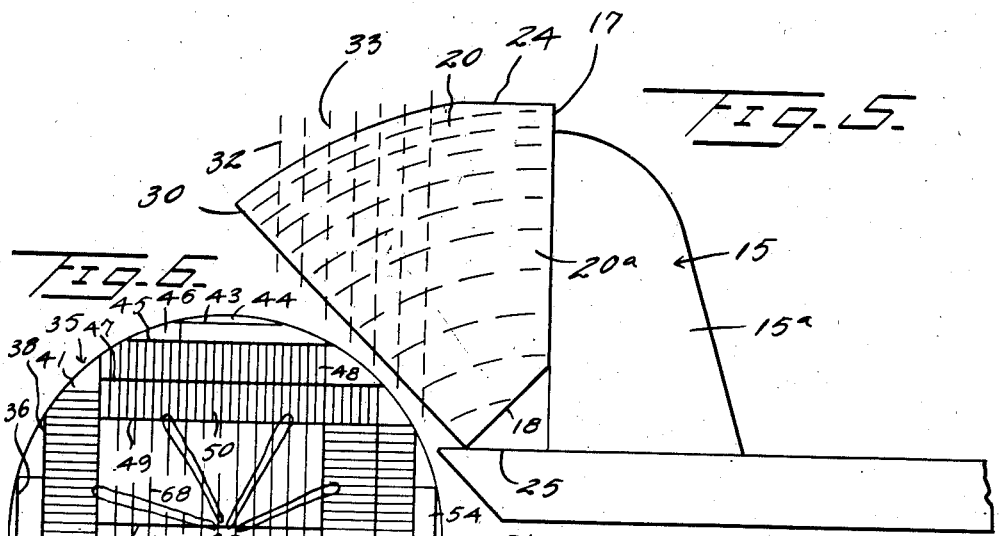
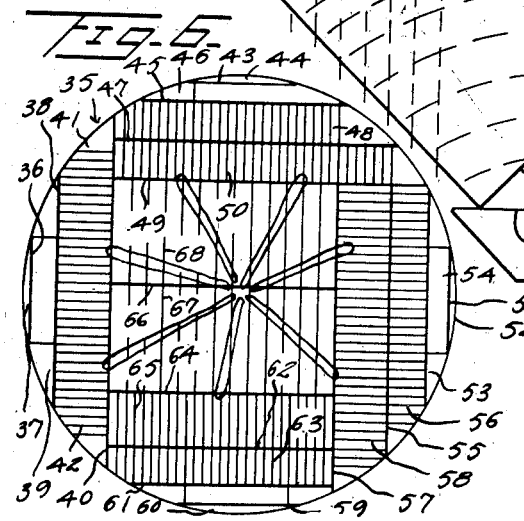
Inventor
E. P. Stamm
By Kimmel & Crowell
Attorneys Patented Apr. 6, 1943

2,316,111

UNITED STATES PATENT OFFICE 2,316,111

METHOD OF CUTTING RECTANGULAR LUMBER

Edward P. Stamm, Portland, Oreg.

Application January 12, 1942, Serial No. 426,502

5 Claims. (Cl. 144—309)

This invention relates to an improved method of sawing or cutting logs into lumber.

An object of this invention is to provide an improved method of cutting logs, so that all of the lumber obtained therefrom will have substantially perpendicular grain.

Another object of this invention is to provide an improved method of cutting logs, so that there will be a minimum of waste, and at the same time, a maximum number of boards of rectangular cross-section may be cut therefrom with the grain of each board substantially perpendicular to the opposite faces thereof.

A further object of this invention is to provide an improved method of cutting logs whereby the cutting may be performed in small mills with inexpensive machinery or apparatus, so that a small mill will be able to handle logs of practically any size, thereby eliminating the necessity of transporting the larger logs over greater distances to a suitable mill.

A further object of this invention is to provide an improved method of cutting logs which will permit the mill to set up the necessary machinery at a relatively close point to the felling location, and to shift the machinery to another location when desirable or necessary.

To the foregoing objects and to others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention as claimed.

In the drawings:

Figure 1 is a detail end elevation of a quartered log used in carrying out the method hereinafter described, Figure 1A is a detail end elevation of a quartered log showing the first step in preparing the log to carry out this method, Figure 2 is an end elevation of the quartered log showing the second step employed in preparing a log to carry out this method, Figure 3 is a detail end elevation of the log showing the first step in cutting boards therefrom, Figure 4 is a detail end elevation showing the second step of cutting boards from the log, Figure 5 is a detail end elevation of the log showing the last step in cutting boards therefrom, and Figure 6 is a diagrammatic view of a log showing the conventional method of cutting the same to form rectangular lumber.

The terms peculiar to the lumber industry which are used in this description are defined below according to general usage in the Pacific Coast lumber industry.

A sawmill carriage or just carriage is a conveyance running on steel rails and used to carry the log or log section past the saw and back again.

Carriage blocks or skids are the steel or iron cross members, mounted horizontally on a sawmill carriage frame, on which the log or log section rests.

A carriage knee is the upright steel or iron member with a perpendicular face which operates in combination with each carriage block to push the log or log section toward the saw before a cut is made. It usually slides on the top surface of the carriage block.

A carriage dog is a pointed hooked arrangement of various types fastened to the knee, used for holding the log or log section firmly while sawing is in progress.

Vertical grain lumber is lumber which has the annular rings (grain) running approximately at right angles to the two opposite wide faces of the board.

Flat or slash grain lumber is lumber which has the grain running approximately parallel to the two opposite wide faces.

The dividing line between vertical and flat grain is genereally accepted as a grain angle of 45 degrees. By outwardly from the carriage is meant in a direction toward the saw.

In carrying out the improved method of cutting up a log so as to provide the maximum number of boards having the grain thereof substantially perpendicular to the opposite faces thereof, the log 10 is initially cut in quarters, so as to provide quarter sections 11, 12, 13 and 14. This quartering is preferably done with a rip drag saw before taking the log up into the mill, so that a small low cost mill may be used to secure full utilization of any size log into vertical grain lumber.

Each quarter section is then mounted on the blocks or skids of a sawmill carriage shown fragmentarily at 15 in Figure 1A. The quarter section, as for example section 11, is initially mounted so that the flat faces 16 and 17 thereof, which are substantially at right angles to each other, will be disposed at an angle to the vertical, preferably, about an angle of 45 degrees. The carriage is then run past the saw, making an angled cut as at 18 so as to cut off the heart section 19 of the quarter log. The heart portion 19 is triangular in end elevation and may be resawed into boards of second or other grade lumber.

The remaining log section 20 is then turned on the skid or carriage block 15 with the flat face 16 thereof abutting against the flat face 21 of the carriage or skid knee 15a which is movable transversely of the carriage, that is, toward and away from the saw. The other or rounded surface 22 of the log section 20 is lowermost and the flat face 17 is substantially horizontal. In this position the axial center of the log grain is above the skid or carriage and about in the vertical plane of the forward face of the knee 15a. The log section 20 is held in position by any suitable means, such as conventional carriage dogs or the like, so that the log section will remain in the desired position during the movement of the carriage past the saw. Initially a relatively thin slab 23 is cut from the projecting upper portion of the log section 20, the slab being cut along the line 24 which is parallel to the flat face 16. This thin slab is cut from the log section so as to provide an even right angle bearing surface for the log section 20 against the knee 15a when the cutting of the boards progresses.

In Figure 2 the log section 20 is shown in an inverted position with the flat face 17 resting on the horizontal upper side 25 of the skid or carriage 15. In Figure 3 the log section 20 is shown turned so the flat face 17 rests on the horizontal upper side 25 of the carriage skid 15 and with the sawn face 24 against the carriage knee 15a. The log section 20 is then pushed out by operation of the carriage knee 15a any desired amount, so that when the carriage is run past the saw a vertical cut 26 is made lengthwise through the log section 20 so as to cut off the initial board 27. As will be noted from the dotted curved lines in Figure 3, which represent the annular rings or grain, the grain of the broad 27 is substantially perpendicular to the opposite faces of this board and the axial center of the grain is substantially coplanar with the upper side of the skid. One or more additional cuts 28 may also be made inwardly from the cut 26, thereby cutting off one or more additional boards 29. As many additional cuts 28 may be made lengthwise of the log section 20 as may be desired until the grain of the lumber inclines to an undesired degree with respect to the perpendicular.

After the last cut 28 has been made in the log section 20, the log section 20 is positioned as shown in Figure 4. In this position, the flat face 18 formed by cutting out the heart section 19 rests on the upper side 25 of the carriage skid 15 and the flat face 17 extends angularly upward from the upper side 25 of the carriage skid and contacts at its upper edge with the face 21 of the knee 15a. In the position shown in Figure 4, any desired number of vertical cuts 29 to 30 may be made in the log section 20, as shown by the dotted lines, until, as in the cutting shown by Figure 3, the grain of the lumber inclines to an undesired degree with respect to the perpendicular. It will be noted that during the initial cutting of the log 20 as shown in Figure 4, the first boards 31 will have the grain thereof inclined to a decided degree with respect to the perpendicular, but as additional cuts are made which extend to the larger portion of the log section 20, these additional cuts will be made with the grain more nearly perpendicular to the opposite faces of the boards.

After the last cut 30 has been made in the remaining log section 20, the remaining section is shifted to the position shown in Figure 5. In this position the flat face 17 of the reduced log section 20 is disposed in face abutting relation to the knee 15a of the carriage and the right angular edge formed by the flat faces 18 and 30 rests on the upper side 25 of the carriage skid 15. The axial center of the log grain is also below the skid and about in the vertical plane of the forward side of the knee 15a. In this cutting operation as with the operation shown in Figure 4, the initial vertical cuts 32 will be made through the smaller portion of the log section wherein the grain of the lumber will be inclined to the perpendicular to the greatest degree.

As additional cuts 33 are made in the reduced log section 20, the grain of the lumber will gradually be disposed very close to the perpendicular and as many additional cuts 33 are made in the remaining or reduced log 20 as are permitted by reason of the position of the log 20 on the carriage or skid 15. The last log section 20a which remains on the carriage skid 15 will be in the form of a relatively thick board having at least one edge 24 thereof at right angles to the opposite faces of the board. If this remaining log section 20a is thicker than desired, it may then be inverted so as to position the right angular flat face 24 lowermost and whatever additional boards are desired may be cut from this last section.

In the cutting of the boards from the log, it will be noted that the longitudinal edges of each board are not initially squared off. One edge is the outer or bark side, whereas the other edge is disposed on a decided angle with respect to the opposite faces of the board. These opposite longitudinal edges may be squared off in the usual manner with only a minimum amount of waste. It will also be noted that practically every board cut from the log will be cut with the grain thereof very close to the perpendicular so that each board will be formed of first-grade lumber, whereas heretofore in the cutting of the boards from the log, a very considerable number of the boards were known as skash or flat grain boards which have a tendency to warp and split quite easily. This is due in part to the shrinkage of the lumber when drying, as the shrinkage is considerably greater in a direction parallel to the annular rings than it is in a direction at right angles to them.

In Figure 6 there is disclosed an end elevation of a relatively large log showing the conventional manner in which the log is cut up into planks and boards. In the manner or method now used for cutting a log of the type shown in Figure 6, the log 35 is placed on the conventional skid or carriage and initially a cut 36 is made through the log removing a relatively thin slab 37. The log is then shifted towards the saw and a second vertical cut 38 is made parallel with the first cut 36 thereby removing a slab or plank 39 which may be cut by a pair of parallel cuts forming the opposite edges of the plank. A further cut 40 is made in the log parallel with the cut 38 and the plank 41 is then cut at right angles along the lines 42 to form fairly narrow planks or boards.

The log is then turned on the skid or carriage ninety degrees and an initial cut 43 is made removing a thin slab 44. A second cut 45 is made parallel with the cut 43 removing a slab or plank 46 which may be formed into a plank or board having a rectangular configuration in end elevation. A further cut 47 is then made parallel with the cut 45 and the removed plank is then cut along the lines 48 to form the desired narrow boards or planks. An additional cut 49 is made in the log parallel with the cut 47 and the removed plank may then be cut along the lines 50 to form boards or planks of desired thickness.

After the cut 49 has been made in the log, it is again turned for ninety degrees and an initial cut 51 is made in the side of the log removing a thin slab 52. A second cut 53 is made parallel with the cut 51 and a rectangular plank 54 may be formed from the slab removed by the cut 53. An additional cut 55 is then made in the log and the removed plank may then be cut along the lines 56 to provide the desired thickness of boards which are rectangular in end elevation. A further cut 57 is then made in the log parallel with the cut 55 and the removed plank is then cut along the lines 58 to provide the desired rectangular boards.

After the cut 57 has been made the log is again turned through an arc of ninety degrees and an initial cut 59 is made thereby removing a thin slab 60. A second cut 61 is made parallel with the cut 59 and the removed plank is then squared off at the opposite edges to provide the desired plank or board rectangular in end elevation. A further cut 62 is made parallel with the cut 61 and the removed plank may then be cut along the lines 63 to provide the desired rectangular boards. An additional cut 64 may then be made in the remaining portion of the log and the removed plank cut along the lines 65 to provide the desired rectangular boards. After the cut 64 has been made, there will be a plank or log which is substantially squared in end elevation and this remaining log section may be cut along the lines 66 to provide the remaining section in two pieces, and these two remaining pieces may be cut along the lines 67 and 68 to provide the desired thickness of boards or planks.

By cutting a log as hereinbefore described, there will be very little waste in the log and a greater amount of the lumber derived therefrom will be first-grade lumber having substantially perpendicular grain. This method of cutting a log is designed particularly for logs of fairly large diameter which in their initial state are preferably quartered in order to permit the easy handling of the logs by a fairly small mill. By cutting a log as hereinbefore described, the small mill can easily and quickly cut up a log with very inexpensive equipment so that a portable mill can be used in cutting the log, and this mill may be shifted to the felling location, in order to cut up the logs as they are being felled. This latter procedure eliminates the long transportation of the heavier logs to mills large enough in point of equipment to handle such logs and to cut them advantageously into the desired boards.

What I claim is:

1. The method of cutting boards from a log with the grain of each board substantially perpendicular to the opposite faces thereof which includes initially quartering the log, cutting a triangular heart section from a quarter section, disposing one flat face of the truncated quarter section in a horizontal position on a log carriage, making a series of vertical cuts through the log parallel with the opposite flat face of the log section, shifting the reduced log section to dispose in a horizontal position the flat face formed by cutting of the heart section, making a second series of vertical cuts through the reduced log section, again shifting the further reduced log section to dispose said first-named flat face in a vertical position, and finally making a third series of vertical cuts in the further reduced log section.

2. The method of cutting boards from a log with the grain of each board substantially perpendicular to the opposite faces thereof which includes initially quartering the log thereby forming a pair of right angular flat faces, cutting a triangular heart section from a quartered log, disposing the log with the rounded side thereof extending upwardly and inwardly from the carriage with one of said first-named flat faces vertical and the other of said first-named flat faces horizontal and spaced upwardly from the log carriage, making a vertical cut through the extended upper portion of the log, shifting the log so as to dispose one of the first-named flat faces horizontal and on the top of the carriage skid, the flat face formed by said first vertical cut being disposed outermost, making a series of vertical cuts through that portion of the log extended from the carriage, shifting the reduced portion of the log so as to dispose the flat face formed by cutting of the triangular heart section in a horizontal position, making a second series of vertical cuts, again shifting the further reduced log section so as to dispose the remaining of the first-named flat faces vertical and in an outermost position, making a third series of vertical cuts through the further reduced log section.

3. The method of cutting boards from a log with the grain of each board substantially perpendicular to the opposite faces thereof which includes initially quartering the log thereby forming a pair of right angular flat faces, cutting a triangular heart section from a quartered log section to provide an obtusely angled bearing surface, shifting the log circumferentially so as to position the axial center of the grain thereof outermost and in a plane above the log carriage, one of said flat faces being disposed in vertical position, and the other of said flat faces disposed in a horizontal position above the upper surface of the log carriage, making a relatively small vertical cut through the log parallel to said vertical face at right angles to said horizontal face to thereby provide a flat bearing surface at right angles to one of said first flat faces, again shifting the log circumferentially to dispose the axial center of the grain thereof innermost and substantially co-planar with the plane of the upper surface of the log carriage and dispose the bearing surface formed by said small vertical cut outermost and in a vertical knee abutting position, making a series of vertical cuts through the remaining portion of the log, again shifting the reduced log section circumferentially to position the axial center of the grain thereof below the upper surface of the carriage skid, making a second series of vertical cuts through the reduced log section, again shifting the further reduced log section on the carriage to position the axial center of the grain thereof below the upper side of the carriage skid and outwardly from the inner side thereof, and making a third series of vertical cuts in the further reduced log section.

4. The method of cutting boards from a log with the grain of each board substantially perpendicular to the opposite faces thereof which includes initially quartering the log to thereby form a pair of right angularly disposed flat faces, cutting a triangular heart section from a quartered log section, positioning the reduced log section in a substantially inverted position with one face of said first pair of flat faces vertical and the other of said pair of flat faces horizontal and above the upper side of the log carriage, the axial center of the grain of the log section being outwardly from the inner side of the said carriage and in a plane above the upper side thereof, making an initial vertical cut parallel to said vertical flat face, shifting the log circumferentially to thereby position the first-named horizontal face in a horizontal position and in contact with the upper side of the carriage, the flat face formed by said first vertical cut being disposed outermost with respect to the saw and in knee abutting position, said first-named vertical flat face being disposed in inwardly extended position with respect to the inner side of the log carriage and the axial center of the log grain being disposed inwardly of the inner side of the log carriage and substantially co-planar with the upper side of the latter, making a series of vertical cuts through the log section with each cut of said series being disposed outwardly of the axial center of the log grain, shifting the reduced log section circumferentially to dispose the flat face formed by cutting of the triangular heart section in a horizontal position and said first-named horizontal flat face disposed in an upwardly and outwardly extended position thereby positioning the axial center of the log grain below the upper side of the log carriage and below the upper side of the latter, making a second series of vertical cuts in the reduced log section with the initial ones of said second series of cuts disposed inwardly of the axial center of the log grain, the latter ones of said second series of cuts being disposed outwardly of the axial center of the log grain, again shifting the reduced log section circumferentially to position the axial center of the log grain below the upper side of the log carriage and outwardly of the inner side thereof and finally making a third series of vertical cuts in the further reduced log section.

5. The method of cutting boards from a log with the grain of each board substantially perpendicular to the opposite faces thereof which includes initially quartering the log thereby forming a pair of right angular faces in each log section, cutting a triangular heart section from a quartered log section to provide an obtusely angled bearing surface, shifting the log circumferentially to dispose the axial center of the grain thereof innermost and substantially coplanar with the upper surface of the log carriage, one of said flat faces being vertical and innermost with respect to the saw and the other flat face resting on the carriage, making a series of vertical cuts through the log, again shifting the reduced log circumferentially to position the axial center of the grain thereof below the upper surface of the carriage with the obtusely angled bearing surface resting horizontally on the carriage, making a second series of vertical cuts through the reduced log section, again shifting the further reduced log section on the carriage to position the axial center of the grain thereof below the upper side of the carriage and outwardly of the inner side thereof, and making a third series of vertical cuts in the further reduced log section.

EDWARD P. STAMM.